US012676266B2

(12) United States Patent
Chung et al.

(10) Patent No.: US 12,676,266 B2
(45) Date of Patent: Jul. 7, 2026

(54) PACKAGING OF ROLL-TYPE SOLID ELECTROLYTIC CAPACITOR ELEMENTS

(71) Applicants: Yu-Peng Chung, New Taipei City (TW); Chia-Wei Li, Taoyuan City (TW); Wen Cheng Hsu, Taipei City (TW); En-Ming Chen, New Tiapei City (TW); Che-Chih Tsao, Hsinchu (TW)

(72) Inventors: Yu-Peng Chung, New Taipei City (TW); Chia-Wei Li, Taoyuan City (TW); Wen Cheng Hsu, Taipei City (TW); En-Ming Chen, New Tiapei City (TW); Che-Chih Tsao, Hsinchu (TW)

( * ) Notice: Subject to any disclaimer, the term of this patent is extended or adjusted under 35 U.S.C. 154(b) by 93 days.

(21) Appl. No.: 18/445,743

(22) Filed: Jan. 12, 2024

(65) Prior Publication Data

US 2024/0304394 A1     Sep. 12, 2024

Related U.S. Application Data

(63) Continuation-in-part of application No. 17/992,882, filed on Nov. 22, 2022, now Pat. No. 12,057,275.
(Continued)

(51) Int. Cl.
*H01G 9/08*        (2006.01)
*H01G 9/012*       (2006.01)
(Continued)

(52) U.S. Cl.
CPC ............... *H01G 9/08* (2013.01); *H01G 9/012* (2013.01); *H01G 9/10* (2013.01); *H01G 9/151* (2013.01)

(58) Field of Classification Search
None
See application file for complete search history.

(56) References Cited

U.S. PATENT DOCUMENTS 3,475,659 A * 10/1969 Cannon, Jr. .............. H01G 9/08
                                              361/328
4,803,598 A * 2/1989 Efford ...................... H01G 9/08
                                              361/541
(Continued)

FOREIGN PATENT DOCUMENTS

JP        2000269084 A * 9/2000
JP        2021158183 A * 10/2021 ............. H01G 11/78

*Primary Examiner* — Eric W Thomas

(57)        ABSTRACT

This invention describes a packaging structure for roll-type (wound-type) aluminum conductive polymer capacitor element. Two protective substrates are applied to sandwich a roll-type capacitor element in between with an insulating material surrounding the capacitor element also in between the protective substrates. The protective substrates comprise electrically separated anodic conductive pad and cathodic conductive pad on their surfaces. The capacitor element is oriented with its axis perpendicular to the two substrates. The anodic and cathodic leads of the capacitor element pass through the through holes. An anodic external terminal is plated over the anodic conductive pad and a cathodic external terminal is plated over the cathodic conductive pad so that the anodic external terminal is electrically connected to the anodic lead and the cathodic external terminal is electrically connected to the cathodic lead. In another arrangement, the anodic and cathodic leads are bent by about 90 degree so that they point to the two sides of the packaging. External terminals are placed on the two sides of the packaging on the surfaces of the insulating material. In still another arrangement, the packaging structure uses only one protective substrate.

14 Claims, 9 Drawing Sheets

Related U.S. Application Data

(60) Provisional application No. 63/437,755, filed on Jan. 9, 2023.

(51) Int. Cl.
    *H01G 9/10*         (2006.01)
    *H01G 9/15*         (2006.01)

(56)             References Cited

U.S. PATENT DOCUMENTS

| | | | |
|---|---|---|---|
| 12,057,275 B2 * | 8/2024 | Chung | H01G 9/08 |
| 2014/0262459 A1 * | 9/2014 | Chen | H01G 9/0029 |
| | | | 29/25.03 |
| 2023/0253162 A1 * | 8/2023 | Chung | H01G 9/012 |
| | | | 361/540 |

* cited by examiner

Fig. 1 (Prior art)
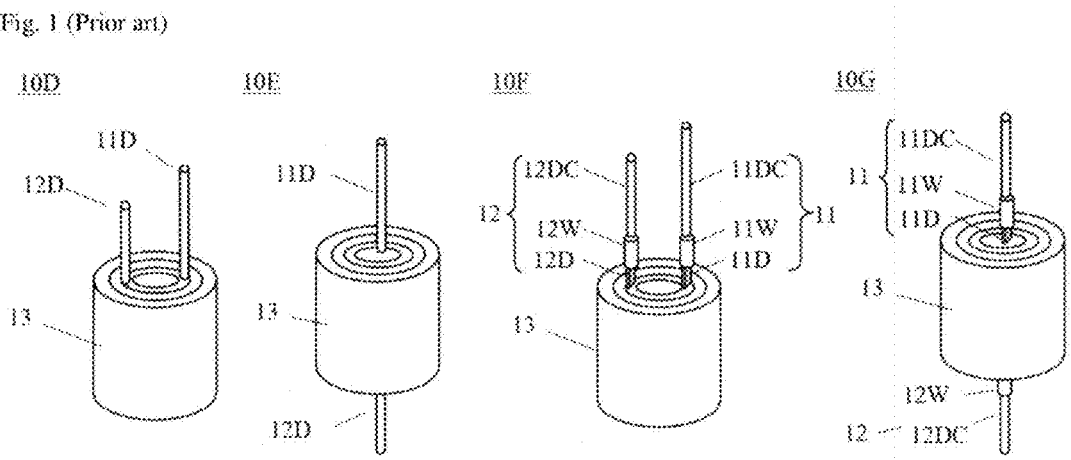
Fig. 2A
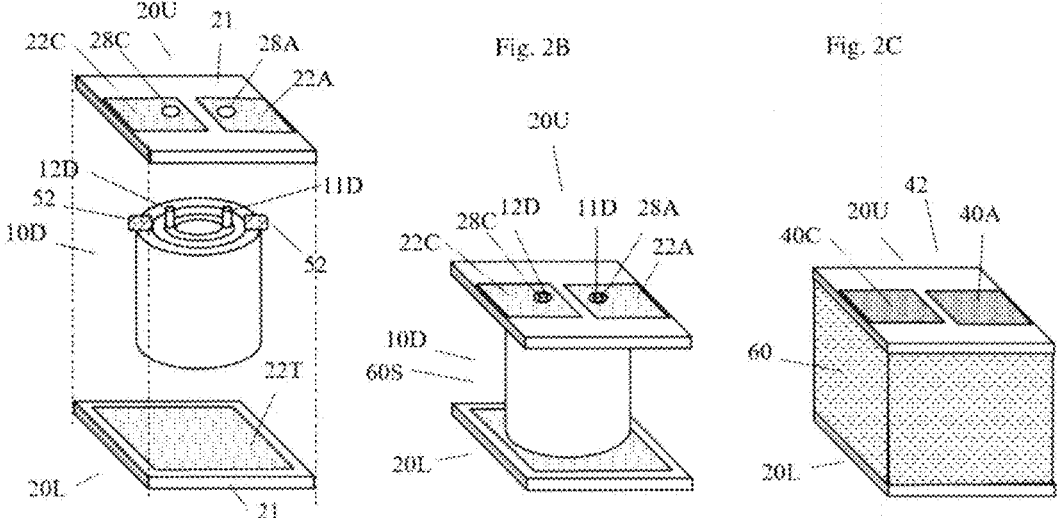
Fig. 2B
Fig. 2C

Fig. 8A
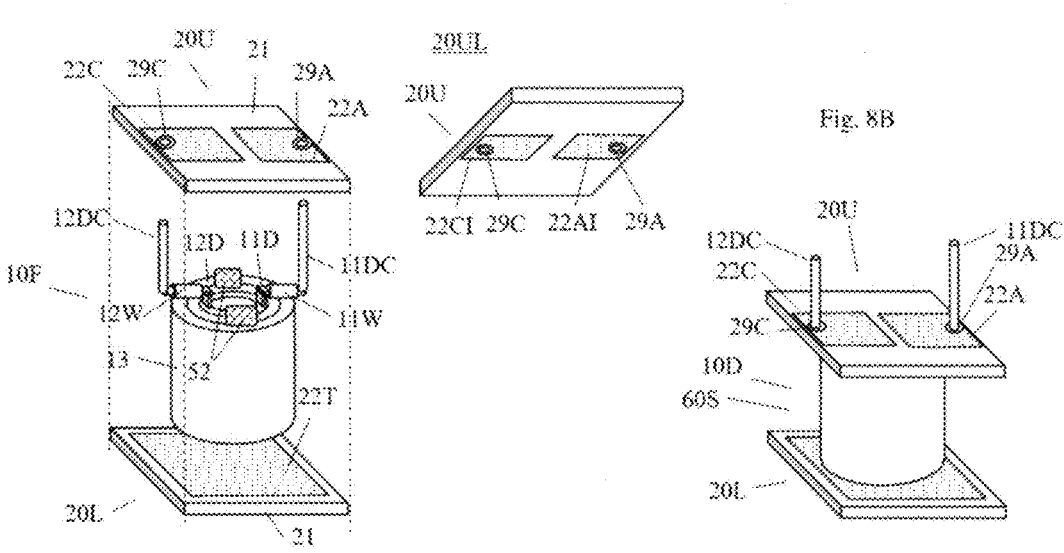
Fig. 8B
Fig. 8C
Fig. 8D
Fig. 8E
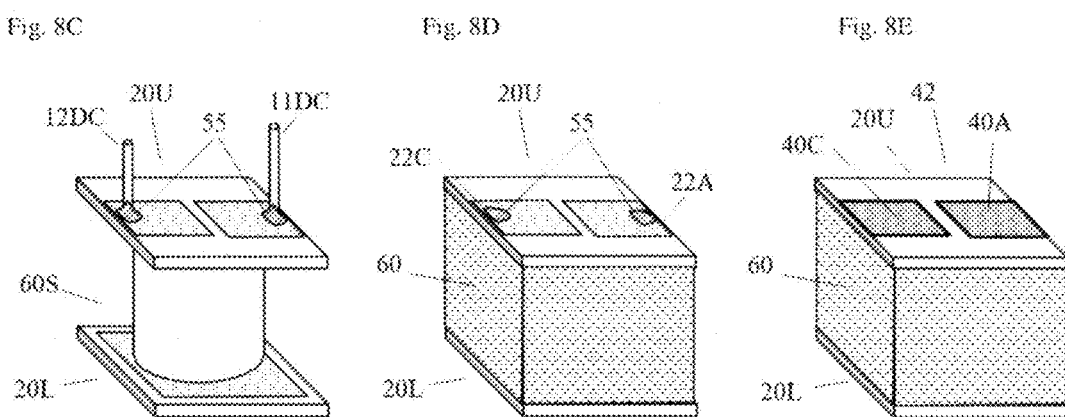

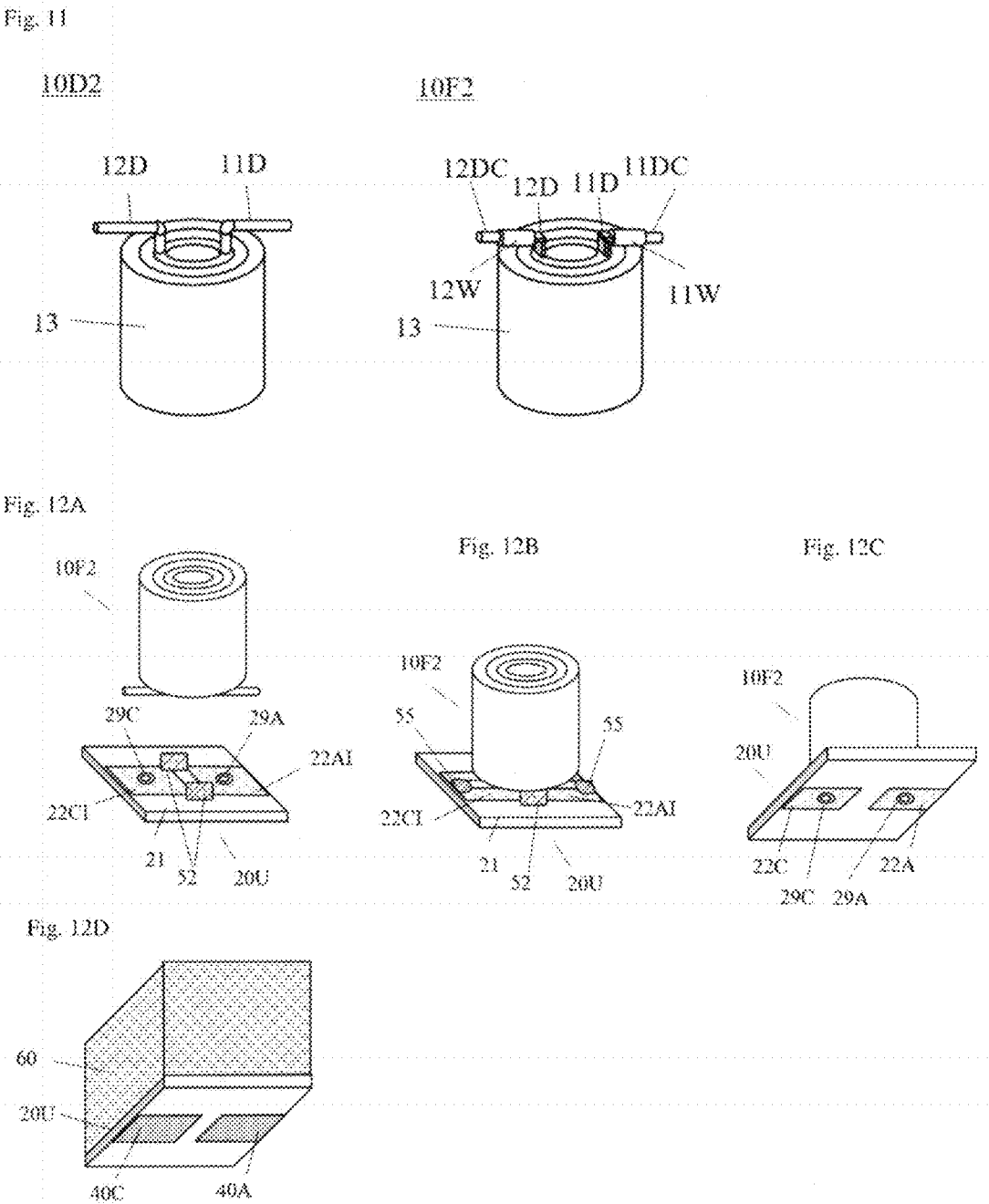

Fig. 13A
Fig. 13B
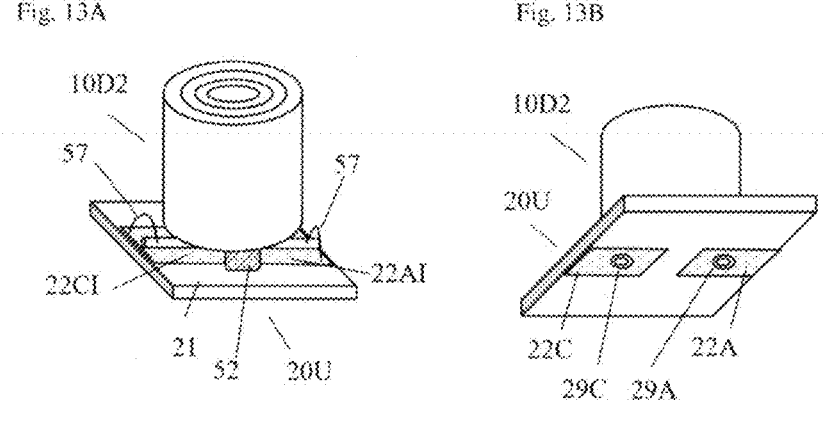
Fig. 14A
Fig. 14B
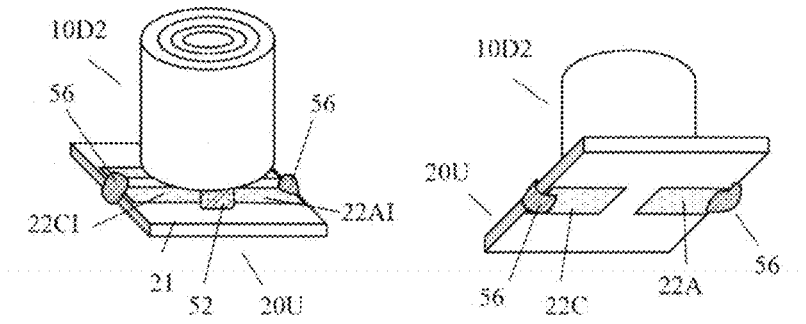
Fig. 15A
Fig. 15B
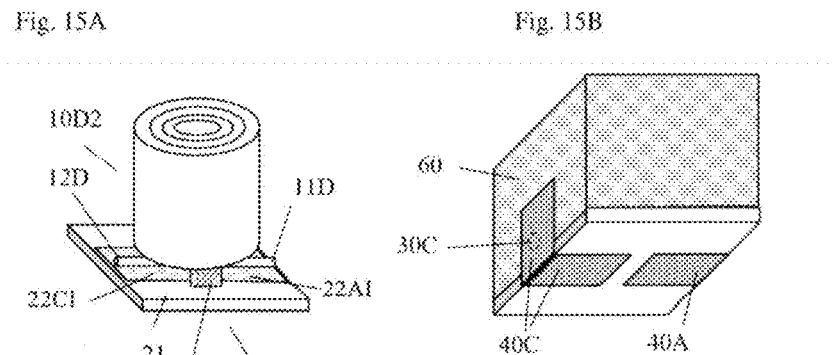

PACKAGING OF ROLL-TYPE SOLID ELECTROLYTIC CAPACITOR ELEMENTS

CROSS REFERENCE TO RELATED APPLICATIONS

This application is a Continuation in Part of patent application Ser. No. 17/992,882, filed Nov. 22, 2022 by the present inventors, which is incorporated by reference in its entirety. This application also claims the benefit of provisional patent application Ser. No. 63/437,755, filed on Jan. 9, 2023 by the present inventors, which is incorporated by reference in its entirety.

BACKGROUND OF THE INVENTION

1. Field of the Invention

The present invention relates to packaging structures and methods of capacitor devices, especially of roll-type capacitor devices.

2. Background

Roll-type solid electrolytic capacitors packaged by existing approach have shortcomings in terms of device size and vibration resistance and therefore have limitations in certain application areas. FIG. 1 depicts several common forms of roll-type (wound) solid electrolytic capacitor element that can be made by existing commercial equipment from commercially available parts. Form 10F and form 10G are the most typical forms. A typical roll-type (wound) solid electrolytic capacitor element comprises a cylindrical capacitor element body 13, an anodic lead 11 and a cathodic lead 12. The capacitor element body is formed by rolling stripes of etched aluminum foils together with a spacer layer into a cylindrical roll. It was then filled with polymer-based solid electrolyte. The lead usually comprises a 3-section 3-material structure: a root section of aluminum tab or wire (11D, 12D) that is directly welded to the anodic or cathodic aluminum foils in the capacitor element body, an end section of copper clad steel core lead wire (11DC, 12DC) and a joining section (11W, 12W) where the aluminium tab is welded to the end section. For convenience, this is called standard lead. It is also possible to obtain capacitor elements with leads of aluminium wire only, as shown as 11D and 12D in form D and form E. Form 10F, and form 10D, has both leads on the same end of the body while form 10G, and form 10E, has the two leads on opposite ends. Existing packaging approach for roll-type solid electrolytic capacitors applies a can-shape aluminum casing to contain the body and seals the casing, at one end or both ends, with a sealing material, such as plastics or rubber, clamped by the aluminum casing. This packaging approach involves multiple discrete components that must be manufactured separately, requires several special machines and generally has to be performed piece by piece, that is, not by parallel processing. In many packaged capacitors, the sealing takes up a significant portion of the total device volume. Further, this can-type packaging leaves the capacitor element in the casing supported only from one end or two ends at the aluminium lead without any mechanical support to the capacitor element body. As a result, material fatigue at the aluminium leads under frequent vibrations creates reliability issues for applications in vehicle and transportation industries.

Solid electrolytic capacitor elements are fragile and therefore some common electronic packaging processes are difficult to apply. Conventional packaging process such as molding compound by transfer molding is associated with highly viscous material flow under large pressure. To make thin insulation, in order to reduce device size, the spacing between a mold wall and a capacitor element must be reduced, which increases viscous stress over the capacitor element if the same flow rate is to be maintained. Compression molding reduces pressurized flow but not eliminate it. Sheet compound molding involves high pressure. Accordingly, an improved packaging structure and method will be beneficial.

BRIEF SUMMARY OF THE INVENTION

This invention describes a packaging structure for roll-type (wound-type) aluminum conductive polymer capacitor elements. Two protective substrates are applied to sandwich a roll-type capacitor element in between with an insulating material surrounding the capacitor element also in between the protective substrates. The capacitor element is oriented with its axis of roll perpendicular to the two protective substrates. The anodic and cathodic leads of the capacitor element were cut short and pass through holes to reach the external sides of the protective substrates and are electrically connected to an anodic terminal and a cathodic terminal on the external surface(s) of the protective substrates. For the case of capacitor element with aluminium leads, the external terminals and the electric connections from the terminals to the aluminum electrode leads of the capacitor element is in general made by a multi-step plating process, which includes a zinc substitution step to make the aluminum leads to be able to receive plating. For the case of capacitor element with the standard leads, that is, leads of the typical 3-section 3-material structure with copper clad end sections, the electric connection between the leads and the external terminal is basically by soldering followed by electroplating. The aluminum tab part of the lead (the root section) is bent to rotate the joining section by about 90 degree. This allows the body of the capacitor element to be positioned close to the protective substrate or to the surface of the packaging, reducing overall device size. The copper clad part of the lead (the end section) is also bent to facilitate electric connection to an external terminal. The external terminals and the electric connections from the terminals to the copper clad end of the electrode leads of the capacitor element is in general made by soldering, finishing and copper plating.

The filling of the insulating material can be conducted by a capillary filling process or by a simple pouring and flooding process. In general, liquid insulating material of low to medium viscosity is used and flow speed is kept low so not to damage the capacitor elements. After filling, a curing process hardens the insulating material and bond the assembly into an integral piece.

BRIEF DESCRIPTION OF THE DRAWINGS

FIG. 1 depicts several common forms of roll-type solid electrolytic capacitor element that can be made by existing commercial equipment from commercially available parts.

FIG. 2A, FIG. 2B and FIG. 2C depict the structure and the procedure of packaging a roll-type solid electrolytic capacitor element with aluminium leads on the same end of the capacitor element body by the present invention.

FIG. 5 depicts a cross-sectional view of the packaging structure of FIG. 4.

FIG. 6A and FIG. 6B depict the packaging of a roll-type solid electrolytic capacitor element with aluminium leads on opposite ends of the capacitor element body by the present invention.

FIG. 8A, FIG. 8B, FIG. 8C, FIG. 8D and FIG. 8E depict the structure and the procedure of packaging a roll-type solid electrolytic capacitor element with standard leads on the same end of the capacitor body by the present invention.

FIG. 11 depicts roll-type capacitor elements with their leads bent by about 90 degree so that they point to two sides.

FIG. 12A, FIG. 12B, FIG. 12C and FIG. 12D depict another structure and the corresponding procedure of packaging a roll-type solid electrolytic capacitor element with standard leads bent by about 90 degree and electrical connection by soldering by the present invention.

FIG. 13A and FIG. 13B depict, from two different view angles, another structure of packaging a roll-type solid electrolytic capacitor element with aluminum leads bent by about 90 degree and electrical connection by wire bonding by the present invention.

FIG. 14A and FIG. 14B depict, from two different view angles, another structure of packaging a roll-type solid electrolytic capacitor element with aluminum leads bent by about 90 degree and electrical connection by conductive paste by the present invention.

FIG. 15A and FIG. 15B depict another structure of packaging a roll-type solid electrolytic capacitor element with aluminum leads bent by about 90 degree and electrical connection on the side surfaces of the packaging by the present invention.

DETAILED DESCRIPTION

Details of this invention are described with the following examples:

Example 1

Packaging a roll-type capacitor element with aluminum leads on the same end of the capacitor element body, based on protective substrates with conductive pads on surfaces of non-conductive bodies.

Figures 3, 4A, 4B:
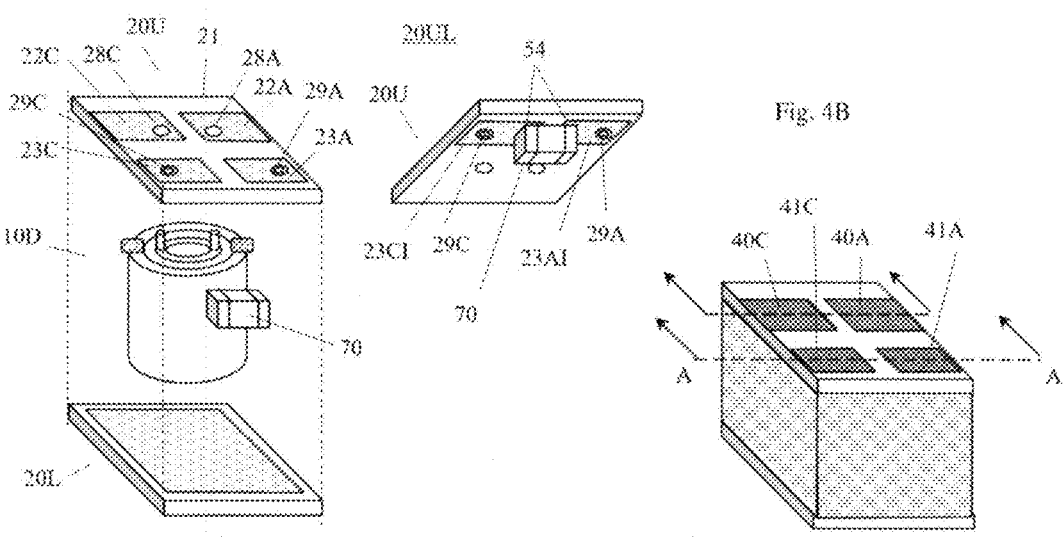
FIG. 3 depicts the cross-sectional view of the packaging structure of FIG. 2.
FIG. 4A and FIG. 4B depict an example packaging structure containing a roll-type solid electrolytic capacitor element and a small capacitor by the present invention.

FIG. 2A depicts the packaging structure containing a roll-type capacitor element, which has its anodic and cathodic leads on the same end, in an exploded view, showing key components. The single capacitor element 10D is positioned in between an upper protective substrates 20U and a lower protective substrates 20L, with its axis perpendicular to the protective substrates. The electrode leads of the capacitor element were cut short in advance so that the remaining parts of the anodic lead 11D and cathodic lead 12D are of aluminum material. The upper protective substrate 20U comprises an electrically insulated substrate body 21 with conductive pads on its outer surfaces (22A, 22C). Two through-holes (28A and 28C) pass through the substrate and the conductive pads. When the components are assembled, the anodic lead 11D passes through hole 28A and the cathodic lead 12D passes through hole 28C, as depicted in FIG. 2B and FIG. 3, which is a cross-sectional view. Glue 52 is applied to attach the capacitor element to the upper protective substrate during assembly. The lower protective substrates 20L comprises an inner metal pad 22T, which acts as anti-moisture shield in the packaging.

The protective substrate can be made from a PCB (printed circuit board) copper clad board, which has an electrically insulated substrate body 21 of, usually, fiberglass reinforced epoxy with copper clad layers on one or both sides. The copper clad layer can be patterned into copper conductive pads by standard PCB processes. Plated through holes can also be processed by standard PCB processes.

FIG. 2A depicts the situation when the key components are assembled. The void 60S between the two protective substrates surrounding the capacitor element is filled with an insulating material 60, as shown in FIG. 2C, which shows a perspective view of the packaged capacitor. The insulating material fills up into the through holes and envelops the whole capacitor element and the electrode leads, as depicted in FIG. 3, a cross-sectional view. The top surface where the two electrode leads protrude is first machined and then coated or plated with a conductive material to form the external terminals, as shown in FIG. 2C, showing a perspective view of the packaged capacitor, with the external terminals 40A (anode) and 40C (cathode) at the top of an insulated body 42. The plated conductive material covers the outer conductive pads (22A, 22C). Thus, external anode terminal 40A and cathode terminal 40C are electrically connected to the anode 11D and cathode 12D of the capacitor element respectively.

The formation of the external terminals and their electrical connections to the conductive pads on the protective substrates are explained further next. After the filling and hardening of the insulating material 60 and before the plating of the external terminal 40A and 40C, the tips of electrode leads 11D and 12D, which protruded slightly above the conductive pads 22A and 22C, were machined so that the surfaces are planarized and the tip faces 11DA and 12DA of the electrode leads are exposed. Next, the tip surfaces, which are aluminum, are first deposited with a first conductive material. For example, by applying a zinc substitution process followed by an electroless nickel strike process, a layer of nickel can be deposited onto the tip surface. In this example, in general, the electroless nickel strike does not plate onto the exposed surface of the nonconductive substrate body 21 or the insulating material 60, nor onto the copper pads (22A, 22C), because copper is not catalytic to electroless nickel. Next, an electroless copper plating is applied, followed by electrolytic plating to build up thickness to form the external terminals 40A and 40C. Proper masks are used during the process to protect areas to be kept non-conductive. The zinc substitution process (or called zincate process or zinc-nickel process) is a plating process for plating over aluminum. Example descriptions of the process can be found in K. Murakami et al., "Effect of Zincate Treatment on Adhesion of Electroless Nickel-Phosphorus Coating for Commercial Pure Aluminum", *Materials Transactions*, Vol. 47, No. 10 (2006) pp. 2518-2523, or in S. Court, "Monitoring of zincate pre-treatment of aluminium prior to electroless nickel plating", Transactions of the Institute of Metal Finishing 95(2): 97-105, both are incorporated here by reference in its entirety.

Example 2

Packaging a roll-type capacitor element, with anodic and cathodic leads on the same end, together with an accompanying device.

For certain applications, it is convenient to include one or a few accompanying devices inside the same package with a roll-type capacitor element, that is, making the combination a circuit in one package.

For example, for a power system of a circuit board, a group of capacitors covering a wide range of capacitances are needed to stabilize power supply (voltage) at each power connection of each device, including bulk capacitors near power connections, ranging from a few micro F to hundreds of micro F, to local filtering and by-pass capacitors, generally from 0.01 to 0.1 micro F. In current practice, individual capacitors of different types and values are used and are assembled one by one to the circuit board. For quantity production of circuit board, it will be convenient to package a combination of multiple capacitors in one package, which reduces total footprint as well as assembly time. For example, near power connectors, aluminum solid electrolytic capacitors of several hundred micro F are frequently used with tantalum capacitors of a few to less than 100 micro F. And locally, smaller capacitors, film type or MLCC (multilayer ceramic capacitor), are used. Therefore, for tight layout, it is possible to combine these capacitors into one package. Because aluminum solid electrolytic capacitors are the largest, it is reasonable to package a roll-type aluminum solid electrolytic capacitor element together with one or more smaller capacitors.

Figures 5, 6A, 6B:
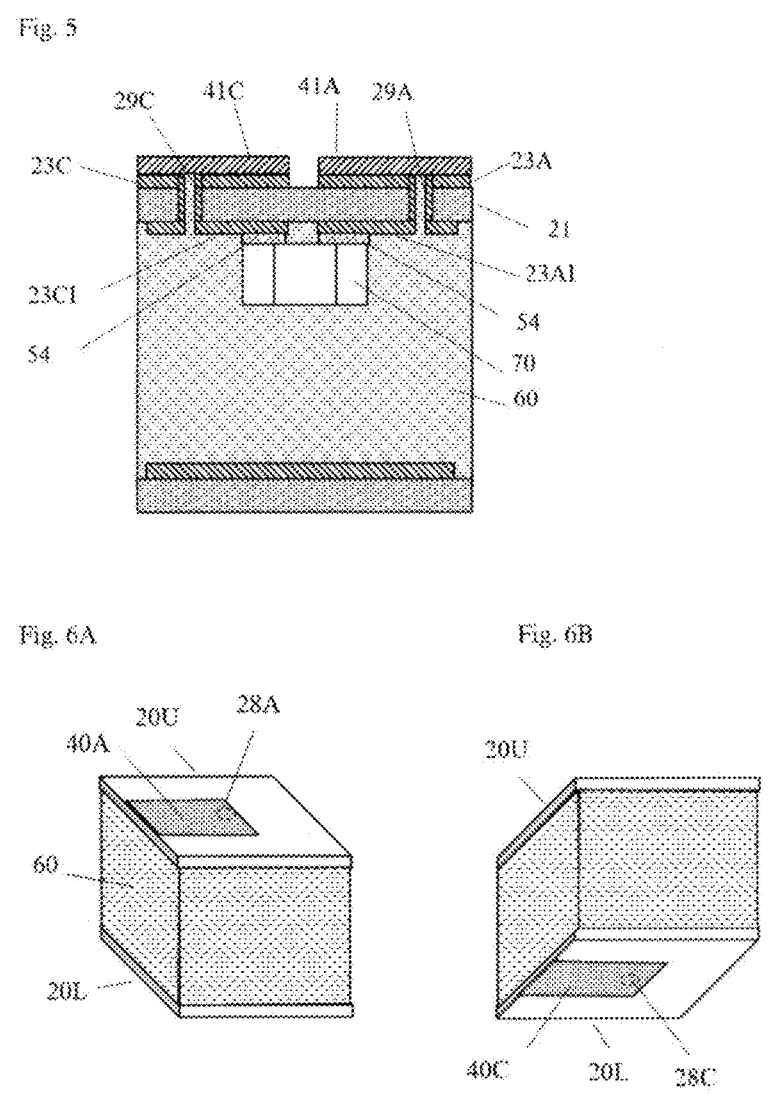

FIG. 4A illustrates an example packaging structure containing a roll-type solid electrolytic capacitor element 10D and a small capacitor 70 in an exploded view. The packaging and connecting method and components for the roll-type solid electrolytic capacitor are basically the same as those of the case of FIG. 2A. However, the upper substrate further includes a second set of outer conductive pads (23C, 23A) and inner conductive pads (23CI, 23AI). 20UL depicts the upper substrate from a lower view angle to show the inner side. The inner conductive pads and the outer conductive pads are electrically connected through vias 29C and 29A, that is, plated through holes. The small capacitor is connected to the second set of conductive pads at the inner side by either soldering or conductive paste 54. The vias and the connection of the small capacitor can be processed in advance in separate processes. The components are then assembled and an insulating material is filled to envelop both capacitors, as shown in FIG. 4B. FIG. 5 illustrates the cross-sectional view of the cut plane A-A indicated in FIG. 4B to show the connection of the small capacitor. Thus, the package contains two independent capacitors with separate external terminals (40C, 40A and 41C, 41A), which are plated over the corresponding conductive pads (22C, 22A and 23C, 23A). In application, the two capacitor can be used as two independent devices and the external terminals can be connected to power/ground planes/nodes of a circuit board according to need.

Example 3

Packaging a roll-type capacitor element with anodic and cathodic leads on opposite ends of the body 10E.

The packaging structure and process will be basically similar to FIG. 2A except that the through hole 28A, the anodic conductive pad 22A and terminal 40A will be on the upper substrate 20U, for example, and the through hole 29A and the cathodic conductive pad 22C and terminal 40C will be on the lower substrate 20L. FIG. 6A and FIG. 6B illustrate a packaged capacitor in this case. FIG. 6A shows the anode side of the package while FIG. 6B shows that cathode side. 28A and 28C indicate the locations of the lead to terminal connection.

Example 4

Batch Manufacturing by Parallel Processing

Figure 7A:
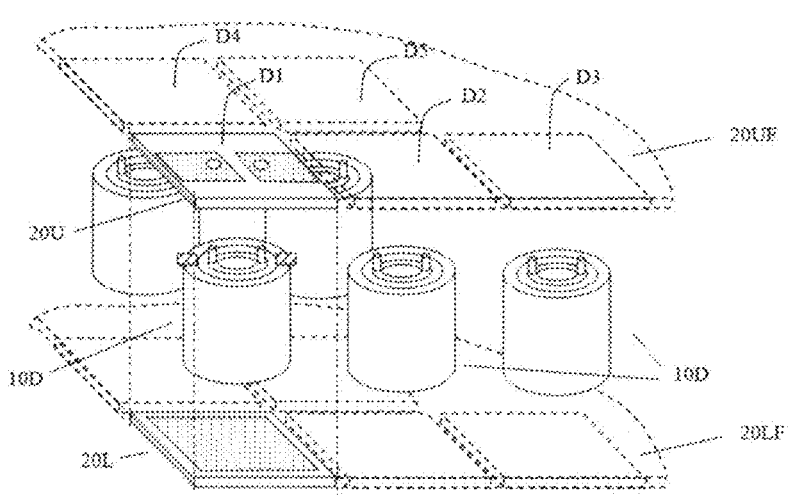
FIG. 7A and FIG. 7B depict batch manufacturing of multiple capacitor devices by the present invention.
Figure 7B:
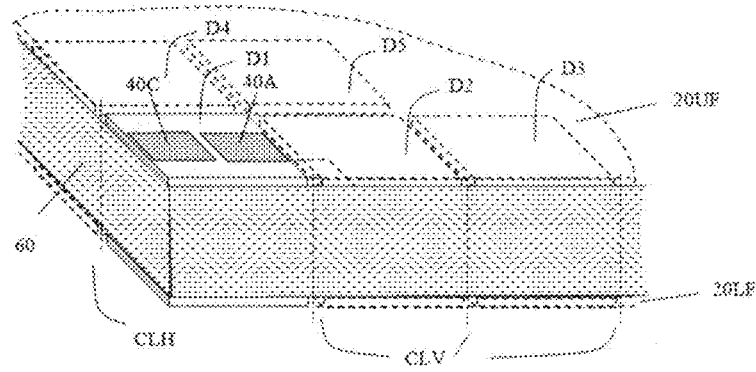

One advantage of this new packaging structure and process is that a large amount of capacitor elements can be processed and packaged in batch at the same time by parallel processing. Although the drawings from FIG. 2A through FIG. 5 illustrate the construction of a single device package, the construction can be extended into a 2D matrix. FIG. 7A and FIG. 7B depict the idea. The protective substrates can start as two large full-size substrates (20UF, 20LF) with conductive pads and holes all pre-processed corresponding to locations of multiple devices (D1-D5). Multiple capacitor elements can then be placed (glued) to these locations and assembled to the substrates.

The insulating material 60 can be filled in between the two full-size substrates as a whole. The filling of the insulating material can be conducted by a capillary filling process or by a simple pouring and flooding process. In general, insulating material of low to medium viscosity is used and flow speed is kept low so not to damage the capacitor elements. After filling, a curing process harden insulating material and bond the assembly into an integral piece. The curing/hardening process inevitably introduces uneven expansion and contraction between the insulating material and the protective substrates. By having two protective substrates sandwiching the insulating material, bending deformation of the assembly after hardening can be minimized.

The plating of the external terminals (e.g. 40A, 40C) of all devices can also be performed simultaneously. Finally, sawing long cutting lines CLH and CLV separate individual devices.

Example 5

Packaging a roll-type solid electrolytic capacitor element with standard leads on the same end of the capacitor element body 10F, based on protective substrates with conductive pads on surfaces of non-conductive bodies The standard leads have copper clad over their extended parts, which ease connection to external terminal because soldering can be applied and zinc substitution is not needed. FIG. 8A to FIG. 8E illustrate the structure and procedure of the packaging. FIG. 8A and FIG. 8B show the assembly procedure of key components, which is similar to FIG. 2A and FIG. 2B except that the leads of the capacitor element are bent or folded. The aluminum tab part of the lead (11D, 12D) (root section) is bent to rotate the joining section (11W, 12W) by 90 degree. This allows the body of the capacitor element to be positioned close to the protective substrate when assembled, reducing overall device size. The copper clad part of the lead (11DC, 12DC) (end section) is also bent so that it points toward a corresponding hole in the upper protective substrate 20U. The folding of leads can be performed by applying a forming die in a separate process before assembling with the protective substrates.

The protective substrate can be made from a PCB (printed circuit board) copper clad board. In FIG. 8B, the capacitor element is glued to the bottom of the upper substrate 20U with the leads passing through two vias, or plated through-holes, (29A, 29C). The plated through-holes electrically connect the outer conductive pads (22A, 22C) and the inner conductive pads (22AI, 22CI) of the anode and the cathode respectively. In other words, areas inside the holes, outside the top of the holes and outside the bottom of the holes as well as the lead wires passing through the holes are all copper. Thus, a point soldering machine can be applied to solder the leads to the pads from the upper side of the upper substrate. With proper use of soldering flux, solder 55 can flow into the plated through-holes and bond the lead to the through-holes and the pads, as shown in FIG. 8C.

Figure 9:
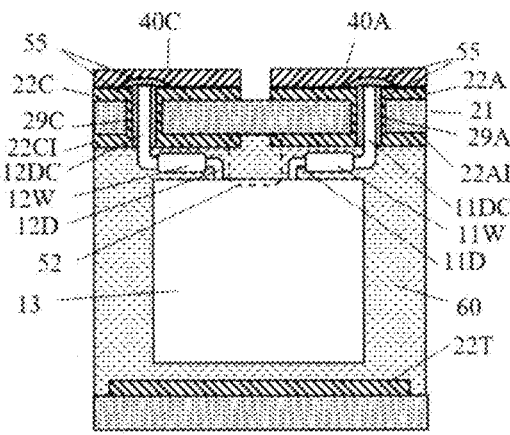
FIG. 9 depicts a cross-sectional view of the packaging structure of FIG. 8.

Insulating material 60 can then be filled and cured so that the assembly is hardened as an integral solid. The protruding leads can then be cut and the residues be polished. FIG. 8D shows the idea. Then a new layer of copper can be electroplated over the copper pads (22A, 22C) and the remaining solder material 55 on the pads to become the external terminals (40A, 40C), as shown in FIG. 8E. FIG. 9 illustrates the cross-sectional view of the completed structure.

It is preferred that the solder used should be a high-temperature solder so that it will not melt when the external terminals of the packaged capacitor go through a reflow soldering process.

Example 6

Packaging a roll-type solid electrolytic capacitor element with standard leads on the same end of the capacitor element body 10F, based on all-conductor protective substrates The protective substrates can also be in the form of conductive substrates and pads only, that is, without an insulating substrate body. For example, this all-conductor substrate can be made of thin copper sheets. This packaging can further reduce overall device thickness. Take the construction of a PCB as example. A typical PCB may have a non-conductive core, of glass fiber reinforced epoxy, of thickness 4 to 8 mil (or 0.1 to 0.2 mm) covered with copper clad of 1 oz or even ½ oz, which corresponds to a thickness of 1.4 to 0.7 mil (or 0.035 to 0.018 mm), on each side. By using PCB as the protective substrates, the total thickness of 2 substrates is around 0.27-0.54 mm. On the other hand, if using 0.1 mm copper foil, the total thickness of 2 substrates can be reduced to 0.2 mm. If using copper clad sheets only, the total thickness of 2 sheets can be further reduced to 0.035-0.07 mm.

Figure 10:
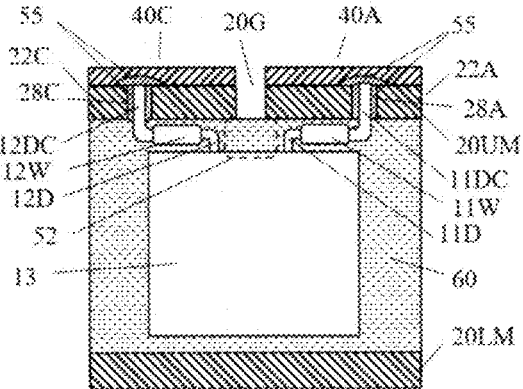
FIG. 10 depicts a cross-sectional view of the packaging structure based on all-conductor protective substrates by the present invention.

FIG. 10 illustrates a cross-sectional view of a packaging structure based on all-conductor protective substrates. This structure is basically similar to that of FIG. 8A except that an upper metal (copper) substrate 20UM and a lower copper substrate 20LM replace the PCB copper clad board. The through holes (28A, 28C) can be direct through holes. The procedure of packaging is also similar to that of FIG. 8A, except that the copper pads 22A and 22C need to be made after the completion of lead soldering and insulating material curing by an etching process to open a gap 20G to separate the two electrodes.

Example 7

Packaging a roll-type capacitor element with standard leads on opposite ends of the body 10G.

This example is similar to example 5 or example 6 except that the anodic lead and the cathodic lead are connected to external terminals on the upper and the lower substrates respectively, at opposite ends of the packaged device. The resulted device looks similar to the one depicted in FIG. 6A.

The present invention disclosed herein has been described by means of specific embodiments and process steps. However, numerous modifications, variations and enhancements can be made thereto by those skilled in the art without departing from the spirit and scope of the disclosure set forth in the claims.

In a different approach, the anodic and cathodic leads are bent by about 90 degree so that they point to the two sides of the packaging. Electrical connections are made between the leads and their corresponding inner conductive pads. This can be done by several approaches:

(1) Soldering, for example, between standard leads (with copper clad) and copper or copper clad pads;

(2) Silver or copper paste, for either standard leads or aluminium leads;

(3) Resistance welding, for either standard leads or aluminium leads;

(4) Ultrasonic welding, for either standard leads or aluminium leads;

(5) Wire bonding, which use an additional thin conductor wire to join the lead on one end and the pad on the other end, usually by ultrasonic welding.

The inner conductive pads and their corresponding outer conductive pads are electrically connected respectively by plated through holes or by conductive paste wrapped around edges of the substrate. Or if an all-conductive substrate is used, then an inner conductive pad and an outer conductive pad are the same pad. By this approach, the electrical connections between the electrode leads and the outer conductive pads are completed before the filling of insulating material.

In FIG. 11, 10D2 illustrates a roll-type capacitor element with aluminum leads bent by about 90 degree so that they point to two sides; 10F2 illustrates a roll-type capacitor element with standard leads bent by about 90 degree so that they point to two sides.

Example 8: As Depicted in FIG. 12A Though FIG. 12D

Packaging a roll-type capacitor element with standard leads bent by about 90 degree 10F2 and pointing to two sides, electrically connecting the leads to their corresponding inner conductive pads by soldering.

FIG. 12A shows that the capacitor element is first glued 52 to the substrate 20U. In the prefabricated substrate, the inner conductive pads and their corresponding outer conductive pads and electrically connected by plated through holes (29A, 29C), FIG. 12C. The leads are then connected to the inner pads (22AI, 22CI) by solder 55 by a soldering process (FIG. 12B). The insulating material 60 is then filled and cured and external terminals (40A, 40C) are formed by a plating process (FIG. 12D).

Example 9: As Depicted in FIG. 13A and FIG. 13B

Packaging a roll-type capacitor element with aluminum leads bent by about 90 degree 10D2 and pointing to two sides, electrically connecting the leads to their corresponding inner conductive pads by a wire bonding process.

This example is similar to Example 8 except that the wire bonding process is used to connect the leads to the pads.

Usually the wire bonding is used to connect aluminium to copper pads. However, it is also possible to connect copper clad lead to copper pads.

Example 10: As Depicted in FIG. 14A and FIG. 14B

Packaging a roll-type capacitor element with leads bent by about 90 degree 10D2 and pointing to two sides, electrically connecting the leads to their corresponding inner conductive pads by a conductive paste 56.

This example is similar to Example 8 except that conductive paste is used to connect the leads to the pads. When the substrate is made from a PCB copper clad board, the conductive paste can be applied to wrap around the edges of the board to connect the inner conductive pads (22AI, 22CI) and the outer conductive pads (22A, 22C). In this case, plated through holes are not needed.

In another different approach, the anodic and cathodic leads are bent by about 90 degree so that they point to the two sides of the packaging and the electrical connections between the leads and the external terminals are placed on the two sides of the packaging on the surfaces of the insulating material. No through holes on the substrates are made or used.

Example 11: As Depicted in FIG. 15A and FIG. 15B

This example has electrical connections on the side surfaces of the packaging. The capacitor element 10D2 with aluminium leads is first glued 52 to the substrate 20U. The element is then filled with the insulating material 60. After the filling and hardening of the insulating material 60, the side surfaces of the packaging are machined to reveal and to planarize the tips of electrode leads 11DA and 12DA. Next, the tip surfaces, which are aluminum, are first deposited with a first conductive material. For example, by applying a zinc substitution process followed by an electroless nickel strike process, a layer of nickel can be deposited onto the tip surface. Copper can then be plated onto the nickel to make external terminals.

Figure 16:
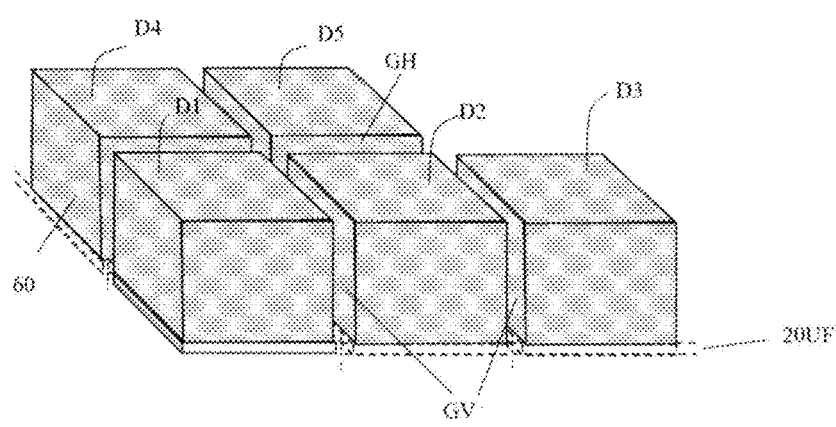
FIG. 16 depicts batch manufacturing of multiple capacitor devices using one protective substrate with insulating material partitioned into individual cells by the present invention.

It is also possible to use only one protective substrate in the packaging, as the example depicted in FIG. 12A and FIG. 15A. However, in a batch manufacturing process where a large substrate is used to carry multiple devices, using only one substrate on one side may result in warping of this intermediate assembly due to shrinkage of insulating material after curing. Such warping creates difficulties for processes that follow. For example, in machining or dicing (cutting into individual devices) processes the intermediate assembly needs to be flat. FIG. 16 depicts a solution to this problem. In the filling or pouring of the insulating material, the insulating material 60 is partitioned into individual cells D1, D2 . . . D5 . . . etc., each containing one capacitor device. One method to do this is to use a mold with a grid structure to create the grooves, GV and GH, that partition the cells. For example, silicone can be used to make a mold with a grid structure and the grid structure of the mold can be placed into the liquid insulating material and be baked together with the insulating material. After the insulating material is cured and hardened, the silicone mold can then be removed, since silicone generally does not stick to epoxy-based insulating materials. Because the insulating material is partitioned into separate small cells, the effect of shrinkage is limited within the area of each individual cell and deformation does not accumulate across the whole intermediate assembly. Later, the intermediate assembly can be cut along the grooves and be separated into individual devices.

What is claimed is:

1. A method for quantity production of packaging structures of roll-type solid electrolytic capacitor including:

(a) providing a substrate, which includes on its surface multiple electrically conductive pads including electrically separated anodic conductive pads and cathodic conductive pads;

(b) disposing multiple roll-type solid electrolytic capacitor elements to surface of the substrate, each one of the multiple roll-type solid electrolytic capacitor elements with a roll axis perpendicular to the substrate and comprising an anodic lead and a cathodic lead, the anodic lead being electrically connected to one of the anodic conductive pads and the cathodic lead being electrically connected to one of the cathodic conductive pads;

(c) disposing a mold with a grid structure to partition the substrate with the multiple roll-type solid electrolytic capacitor elements into multiple individual cells such that each one of the multiple individual cells containing one of the multiple roll-type solid electrolytic capacitor elements;

(d) filling multiple individual cells with a liquid insulating material and then hardening the insulating material and then removing the mold with a grid structure so that the substrate and the capacitor elements and the insulating material join into an integral piece with multiple individual packaging structures partitioned by grooves;

(e) plating over outer conductive pads of the anodic conductive pads and the cathodic conductive pads to form external terminals;

(f) cutting the integral piece along the grooves to separate each of the multiple individual packaging structures.

2. A packaging structure for roll-type solid electrolytic capacitor comprising:

a protective substrate comprising on its two surfaces electrically separated anodic conductive pads and cathodic conductive pads;

a roll-type solid electrolytic capacitor element disposed on the protective substrate with a roll axis perpendicular to the surfaces of the protective substrate, the capacitor element comprising an anodic lead and a cathodic lead, the anodic lead being electrically connected to the anodic conductive pads and the cathodic lead being electrically connected to the cathodic conductive pads;

an insulating material encompassing the capacitor element such that the protective substrate and the capacitor element and the insulating material form an integral solid body;

an anodic external terminal plated over an outer conductive pad of the anodic conductive pads and a cathodic external terminal plated over an outer conductive pad of the cathodic conductive pads, the anodic external terminal being electrically connected to the anodic conductive pads and the cathodic external terminal being electrically connected to the cathodic conductive pads.

3. A packaging structure of claim 2, wherein the anodic conductive pads include an internal anodic conductive pad and the cathodic conductive pads include an internal cathodic conductive pad, the anodic lead and the cathodic lead of the capacitor element are bent to reduce the distance between the capacitor element and the protective substrate.

4. A packaging structure of claim 3, wherein the anodic lead and the cathodic lead of the capacitor element comprise standard leads comprising copper clad end sections and a solder material joins the copper clad end sections to the internal anodic conductive pad and the internal cathodic conductive pad respectively.

5. A packaging structure of claim 4, wherein the internal anodic conductive pad and the internal cathodic conductive pad are electrically connected to the anodic external terminal and the cathodic external terminal respectively by plated through holes on the protective substrate.

6. A packaging structure of claim 4, wherein the protective substrate comprises an all-conductor substrate comprising a thin copper sheet, the conductive pads comprise parts of the thin copper sheet electrically separated by selective etching.

7. A packaging structure of claim 3, wherein the anodic lead and the cathodic lead of the capacitor element comprise aluminum leads.

8. A packaging structure of claim 7, wherein the anodic lead and the cathodic lead of the capacitor element are electrically connected to the internal anodic conductive pad and the internal cathodic conductive pad respectively by wire bonding and the internal anodic conductive pad and the internal cathodic conductive pad are electrically connected to the anodic external terminal and the cathodic external terminal respectively by plated through holes on the protective substrate.

9. A packaging structure of claim 7, wherein the anodic lead and the cathodic lead of the capacitor element are electrically connected to the internal anodic conductive pad and the internal cathodic conductive pad respectively by a conductive paste and the internal anodic conductive pad and the internal cathodic conductive pad are electrically connected to the anodic external terminal and the cathodic external terminal respectively by a conductive paste.

10. A packaging structure of claim 7, wherein the anodic lead and the cathodic lead of the capacitor element are electrically connected to the anodic external terminal and the cathodic external terminal respectively on side surfaces of the packaging structure through an inner nickel layer.

11. A packaging structure of claim 3, wherein
the anodic conductive pads and the cathodic conductive pads comprise through holes passing through the protective substrate;
the anodic lead of the capacitor element passes through the through holes on the anodic conductive pads and the cathodic lead of the capacitor element passes through the through holes on the cathodic conductive pads.

12. A packaging structure of claim 11, wherein
the anodic external terminal and the cathodic external terminal comprise plated copper;
the anodic lead and the cathodic lead of the capacitor element comprise aluminum leads;
the anodic lead and the cathodic lead of the capacitor element are electrically connected to the anodic external terminal and the cathodic external terminal respectively through an inner nickel layer.

13. A packaging structure of claim 11, wherein
the through holes are plated through holes;
the anodic lead and the cathodic lead of the capacitor element comprise standard leads with copper clad end sections and the copper clad end sections are electrically connected to the anodic conductive pads and the cathodic conductive pads respectively by applying a solder material;
the anodic external terminal and the cathodic external terminal comprise the applied solder material and copper plated over the applied solder material.

14. An intermediate assembly structure for quantity production of multiple packaging structures of roll-type solid electrolytic capacitor comprising
a large substrate carrying on its surface multiple electrically conductive pads including anodic conductive pads and cathodic conductive pads;
multiple roll-type solid electrolytic capacitor elements disposed on surface of the large substrate, wherein
each one of the multiple roll-type solid electrolytic capacitor elements is disposed with a roll axis perpendicular to the large substrate and is encompassed by a separate individual packaging structure of an insulating material;
each one of the multiple roll-type solid electrolytic capacitor elements comprises an anodic lead and a cathodic lead, the anodic lead being electrically connected to one of the anodic conductive pads and the cathodic lead being electrically connected to one of the cathodic conductive pads; anodic external terminals plated over outer conductive pads of the anodic conductive pads and cathodic external terminals plated over outer conductive pads of the cathodic conductive pads;
thereby the intermediate assembly structure comprising the multiple packaging structures of roll-type solid electrolytic capacitors with each of the multiple packaging structures comprising:
a protective substrate comprising on its two surfaces at least one of the anodic conductive pads and at least one of the cathodic conductive pads, the anodic conductive pads and the cathodic conductive pads being electrically separated;
one of the roll-type solid electrolytic capacitor elements disposed on the protective substrate with a roll axis perpendicular to the surfaces of the protective substrate, the capacitor element comprising the anodic lead and the cathodic lead, the anodic lead being electrically connected to the at least one of the anodic conductive pads and the cathodic lead being electrically connected to the at least one of the cathodic conductive pads;
the insulating material encompassing the capacitor element such that the protective substrate and the capacitor element and the insulating material form an integral solid body;
the anodic external terminal plated over the outer conductive pad of the anodic conductive pads and the cathodic external terminal plated over the outer conductive pad of the cathodic conductive pads, the anodic external terminal being electrically connected to the anodic conductive pads and the cathodic external terminal being electrically connected to the cathodic conductive pads.

* * * * *